United States Patent
Suzuki

(10) Patent No.: US 6,719,026 B2
(45) Date of Patent: Apr. 13, 2004

(54) PNEUMATIC TIRE HAVING TREAD INCLUDING PAIR OF AXIALLY OUTER BASE RUBBER LAYERS

(75) Inventor: Kazuya Suzuki, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 16 days.

(21) Appl. No.: 09/925,465

(22) Filed: Aug. 10, 2001

(65) Prior Publication Data

US 2002/0036041 A1 Mar. 28, 2002

(30) Foreign Application Priority Data

Aug. 11, 2000 (JP) .......................... 2000-244859

(51) Int. Cl.$^7$ .............................. B60C 1/00; B60C 11/00
(52) U.S. Cl. .................................. 152/209.5; 152/209.18
(58) Field of Search ........................... 152/209.5, 209.18

(56) References Cited

U.S. PATENT DOCUMENTS

| | | | |
|---|---|---|---|
| 3,916,968 A | | 11/1975 | Masson |
| 4,838,330 A | * | 6/1989 | Takayama |
| 5,046,542 A | * | 9/1991 | Ohta et al. |
| 5,616,195 A | | 4/1997 | Marquet et al. |
| 6,412,532 B1 | * | 7/2002 | Iida et al. |

FOREIGN PATENT DOCUMENTS

| | | | |
|---|---|---|---|
| EP | 0718127 A1 | | 6/1996 |
| JP | 5-246212 | * | 9/1993 |
| JP | 8-332806 | * | 12/1996 |
| WO | WO 98/33669 | | 8/1998 |
| WO | WO 00/24596 | * | 5/2000 |

* cited by examiner

*Primary Examiner*—Steven D. Maki
(74) *Attorney, Agent, or Firm*—Birch, Stewart, Kolasch & Birch, LLP

(57) ABSTRACT

A pneumatic tire comprises a tread rubber disposed radially outside a belt, the tread rubber comprising an axially inner base rubber layer, a pair of axially outer base rubber layers, and a radially outer tread rubber layer. The axially inner base rubber layer is disposed on the radially outside of the belt and centered in the tread width. The axially outer base rubber layers is disposed one on each side of the axially inner base rubber layer, on the radially outside of the belt. The radially outer tread rubber layer is disposed over the radially outside of the axially inner and outer base rubber layers. The radially outer tread rubber layer has a hardness HC in a range of from 60 to 80 degrees, the axially inner base rubber layer has a hardness HB1 in a range of from 50 to 65 degrees, the axially outer base rubber layers has a hardness HB2 in a range of from 75 to 95 degrees, and they satisfy the following condition HB1<HC<HB2.

8 Claims, 1 Drawing Sheet

PNEUMATIC TIRE HAVING TREAD INCLUDING PAIR OF AXIALLY OUTER BASE RUBBER LAYERS

Figure 1:
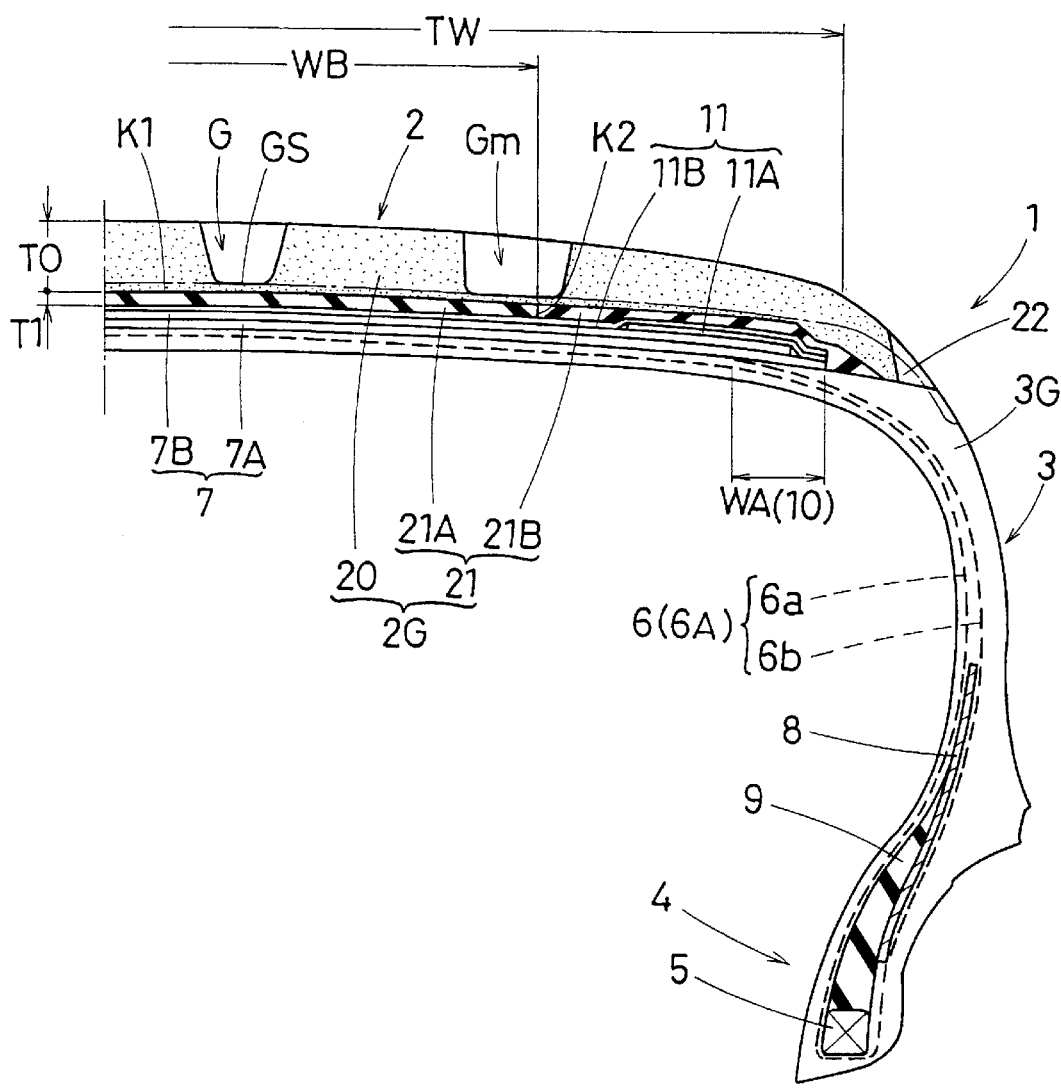

The present invention relates to a pneumatic tire, more particularly to an improved tread structure being capable of improving ride comfort as well as steering stability and high-speed durability.

Pneumatic tires whose tread rubber is composed of a radially outer layer of softer rubber and a radially inner layer of harder rubber are widely used. The main object of this double-layered structure is to improve the ground contact by the softer rubber and improve the steering stability and high-speed durability by the harder rubber.

In such a double-layered structure, as the hardness of the inner rubber layer is increased, the steering stability and high-speed durability can be improved. But, the ride comfort deteriorates.

It is therefore, an object of the present invention to provide a pneumatic tire, in which ride comfort can be improved as well as steering stability and high-speed durability.

According to the present invention, a pneumatic tire comprises a carcass extending between bead portions through a tread portion and sidewall portions, a belt disposed radially outside the carcass in the tread portion, and a tread rubber disposed radially outside the belt, wherein the tread rubber comprises an axially inner base rubber layer, a pair of axially outer base rubber layers, and a radially outer tread rubber layer, the axially inner base rubber layer disposed on the radially outside of the belt and centered in the tread width, the axially outer base rubber layers disposed one on each side of the axially inner base rubber layer, on the radially outside of the belt, the radially outer tread rubber layer disposed over the radially outside of the axially inner and outer base rubber layers, the hardness HC of the radially outer tread rubber layer is in a range of from 60 to 80 degrees, the hardness HB1 of the axially inner base rubber layer is in a range of from 50 to 65 degrees, the hardness HB2 of the axially outer base rubber layers is in a range of from 75 to 95 degrees, and they have a relationship of HB1<HC<HB2.

Here, the hardness of rubber is defined as measured with a type-A durometer according to Japanese Industrial Standard K6253.

An embodiment of the present invention will now be described in detail in conjunction with the accompanying drawings.

FIG. 1 is a cross sectional view of a tire according to the present invention.

In FIG. 1, pneumatic tire 1 according to the present invention comprises a tread portion 2, a pair of sidewall portions 3, and a pair of bead portions 4 each with a bead core 5 therein, and it is provided with a carcass 6 extending between the bead portions 4, and a tread reinforcing belt disposed radially outwardly the carcass 6 in the tread portion 2. The aspect ratio of the tire is less than 60%.

In this embodiment, the pneumatic tire is a high-performance radial tire of size 225/50R16 for passenger cars.

The carcass 6 comprises at least one ply of cords arranged radially at an angle of from 70 to 90 degrees with respect to the tire equator, and extending between the bead portions 4 through the tread portion 2 and sidewall portions 3, and turned up around the bead core 5 in each of the bead portions 4 from the axially inside to the outside of the tire to form a pair of turnup portions 6b and a main portion 6a therebetween. For the carcass cords, organic fiber cords, e.g. nylon, polyester, rayon, aromatic polyamide and the like may be suitably used. The carcass 6 in this example is composed of a single ply 6A of cords arranged radially at 90 degrees.

In this example, the turnup portions 6b are extended into the tread portion 2 through the sidewall portions 3 and overlap with the edge portions of the belt. The axial width WA of the overlap 10 is set in a range of from 5 to 20 mm. Thus, the edges of the turnup portions 6b are secured between the belt and the carcass ply main portion.

Each of the bead portions 4 is provided between the main portion 6a and turnup portion 6b with a bead apex rubber 9. The bead apex rubber 9 extends radially outwardly from the bead core 5, while tapering towards its radially outer end.

Further, each bead portion 4 is provided along the axially outside of the bead apex rubber 9 with a reinforcing layer 8 of steel cords.

The belt in this example comprises a breaker 7 and a band 11.

The breaker 7 is disposed on the crown portion of the carcass 6 and comprises at least two cross plies of high modulus cords, e.g. aromatic polyamide fiber cords, steel cords and the like, arranged at an angle in a range of from 10 to 35 degrees with respect to the tire equator. The breaker 7 extends across the substantially overall tread width TW. In this example, the breaker 7 is composed of only two cross plies 7A and 7B.

The band 11 is disposed on the radially outside of the breaker 7 so as cover at least the edge portions of the breaker 7. Thus, the band 11 may be of (a) an axially spaced two-piece structure wherein the two pieces 11A cover the respective edge portions; (b) a one-piece structure wherein the piece 11B extends across the substantially overall width of the breaker 7; or (c) a combination of the axially spaced two-pieces 11A and the full-width piece 11B. In this example, a combination structure is employed. Preferably, the band 11 is formed by spirally winding at least one organic fiber cord, e.g. nylon and the like, at an angle of not more than 5 degrees with respect to the tire equator.

Here, the tread width TW is the maximum axial width of the ground contacting patch under a standard condition in which the tire is mounted on a standard rim and inflated to a standard load and then loaded with a standard load. The standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

In the tread portion 2, a tread rubber 2G is disposed radially outside the belt. The axial width of the tread rubber 2G is more than the tread width TW. The tread rubber 2G comprises a radially outer tread rubber layer 20, an axially inner base rubber layer 21A and a pair of axially outer base rubber layers 21B. The axially inner base rubber layer 21A is disposed on the radially outside of the belt and axially centered in the tread portion. The axially outer base rubber layers 21B are disposed one on each side of the axially inner base rubber layer 21A, on the radially outside of the belt. The radially outer tread rubber layer 20 is disposed over the radially outside of the axially inner and outer base rubber layers 21A and 21B as the radially outmost rubber layer defining the ground contacting face. The boundary K1 between the radially outer tread rubber layer 20 and each base tread rubber layers 21A, 21B lies radially inside the bottoms GS of tread grooves G.

Excepting the grooved part, it is preferable that the ratio T0/T1 of the thickness T0 of the radially outer tread rubber layer 20 and the thickness T1 of the base tread rubber layer 21A or 21B is in a range of more than 1.0, preferably more than 2.0.

The radially outer tread rubber layer 20 has a hardness HC in a range of from 60 to 80 degrees. The axially inner base rubber layer 21A has a hardness HB1 in a range of from 50 to 65 degrees. The axially outer base rubber layers 21B have a hardness HB2 in a range of from 75 to 95 degrees. And their relationship is HB1<HC<HB2. Preferably, the differences between them are as follows: HB2−HC>5 degrees and HC−HB1>5 degrees.

The axially inner base rubber layer 21A has a n axial width WB which is in a range of from 0.25 to 0.80 times the tread width TW. The axially inner edge of the axially outer base rubber layer 21B is abutted on the axially inner base rubber layer 21A. The boundary K2 between the axially inner base rubber layer 21A and each of the axially outer base rubber layers 21B is placed beneath or in the bottom of a circumferential groove Gm. If the boundary K2 is not placed in such position, as the boundary K2 is located beneath a tread element such as block, rib and the like, uneven wear is liable to occur on the tread element.

Incidentally, in order to prevent a separation failure between the radially outer tread rubber layer 20 and a relatively hard sidewall rubber 3G disposed axially outside the carcass in the sidewall portion 3, a wing rubber 22 having an intermediate hardness between them and a triangular cross sectional shape is disposed in each tire shoulder.

In each tire shoulder, the sidewall rubber 3G extends axially inwards slightly beyond the belt edge beneath the belt. The axially outer base rubber layer 21B extends axially outwards slightly beyond the belt edge while touching to the sidewall rubber 3G. The radially outer tread rubber layer 20 extends near to the axially outer end of the axially outer base rubber layer 21B so that contact with the sidewall rubber 3G becomes minimum.

Comparison Tests

Test tires of size 225/50R16 for passenger car (wheel rim size 7JX16) having a structure shown in FIG. 1 were made and tested for ride comfort, steering stability, and high-speed durability.

The test results and tire specifications are shown in Table 1.

1) Steering Stability Test

A 2500cc FR passenger car provided on all the four wheels with test tires was run on a dry asphalt road in a test course under a normal pressure of 250 kPa, and the test driver evaluated steering stability into ten ranks, based on the handle response, rigidity, grip and the like. The higher the rank number, the better the steering stability.

2) Ride Comfort Test

The test car was run on dry rough roads (including asphalt road, stone-paved road and graveled road) and the test driver evaluated the ride comfort into ten ranks, based on harshness, damping, thrust-up, etc. The higher the rank number, the better the ride comfort.

3) High-speed Durability Test

The tire inflated to 250 kPa and loaded with 4.5 kN was run on a tire test drum, and the running speed was increased every ten minutes at a step of 10 km/h from an initial speed of 170 km/h. The total running distance until any failure occurred was measured. The results are indicated by an index based on Ref.1 being 100. The larger the index number, the better the high-speed durability.

TABLE 1

| Tire | Ref. 1 | Ref. 2 | Ref. 3 | Ex. 1 | Ex. 2 | Ex. 3 |
| --- | --- | --- | --- | --- | --- | --- |
| Radially outer tread rubber layer Hardness HC (deg.) | 70 | 70 | 70 | 70 | 70 | 70 |
| Axially inner base rubber layer | | | | | | |
| Hardness HB1 (deg.) | 60 | 60 | 65 | 60 | 60 | 60 |
| Width (WB/TW) | 0.6 | 0.6 | 0.6 | 0.6 | 0.6 | 0.6 |
| Axially outer base rubber layer Hardness HB2 (deg.) | 60 | 95 | 65 | 75 | 80 | 90 |
| Steering stability | 6 | 7 | 7 | 6.5 | 7 | 7 |
| Ride comfort | 6 | 5 | 5 | 6 | 6 | 6 |
| High-speed durability | 100 | 110 | 115 | 103 | 110 | 113 |

It could be confirmed from the test results that the tires according to the present invention can be improved in the ride comfort as well as the high-speed durability and steering stability.

What is claimed is:

1. A pneumatic tire comprising a carcass extending between bead portions through a tread portion and sidewall portions; the thread portion including a grooved portion;

a belt disposed radially outside the carcass in the tread portion, and a tread rubber disposed radially outside the belt, said tread rubber comprising a radially outer tread rubber layer, an axially inner base rubber layer having a substantially constant thickness, and a pair of axially outer base rubber layers, wherein at a boundary between the axially inner base rubber layer and each said axially outer base rubber layer, the thickness of the axially inner base rubber is the same as the thickness of the axially outer base rubber layer, with the ratio of the thickness of the radially outer tread rubber layer to the thickness of each of the axially inner and outer base rubber layers being greater than 2.0, with the exception of the grooved portion; and said axially inner base rubber layer disposed on the radially outside of the belt and centered in the tread width, said axially outer base rubber layers disposed one on each side of the axially inner base rubber layer, on the radially outside of the belt, said radially outer tread rubber layer disposed over the radially outside of the axially inner and outer base rubber layers, the radially outer tread rubber layer having a hardness HC in a range of from 60 to 80 degrees, the axially inner base rubber layer having a hardness HB1 in a range of from 50 to 65 degrees, the axially outer base rubber layers having a hardness HB2 in a range of from 75 to 95 degrees, and the hardness HC, hardness HB1 and hardness HB2 satisfying the condition HB1<HC<HB2.

2. The pneumatic tire according to claim 1, wherein the hardness NC, hardness HB1 and hardness HB2 satisfy the conditions HB2−HC>5 degrees, and HC−HB1>5 degrees.

3. The pneumatic tire according to claim 2, wherein the axial width WB of the axially inner base rubber layer is in a range of from 0.25 to 0.80 times the tread width.

4. The pneumatic tire according to claim 1, wherein the axial width WB of the axially inner base rubber layer is in a range of 0.25 to 0.80 times the tread width.

5. The pneumatic tire according to claim 1, wherein the tread portion is provided on each side of the tire equator with a circumferential groove, and a boundary between the axially inner base rubber layer and one of the axially outer base rubber layers lies beneath or in the bottom of the circumferential groove.

6. The pneumatic tire according to claim 1, further comprising a sidewall rubber disposed axially outside the carcass in each said sidewall portion and extending axially inwardly beyond the belt edge beneath the belt.

7. The pneumatic tire according to claim 1, further comprising a wing rubber disposed between the radially outer tread rubber layer and a comparatively hard sidewall rubber disposed axially outside the carcass in each sidewall portion, the wing rubber having an intermediate hardness between the radially outer tread rubber layer and sidewall rubber.

8. The pneumatic tire according to claim 1, further comprising a carcass having a turnup portion extending into the tread portion from each said bead portion and overlapping with the edge of the belt and being secured between the belt and the carcass main.

\* \* \* \* \*